(12) United States Patent
Liu et al.

(10) Patent No.: US 8,451,413 B2
(45) Date of Patent: May 28, 2013

(54) ARRAY SUBSTRATE FOR FFS TYPE LCD PANEL AND METHOD FOR MANUFACTURING THE SAME

(75) Inventors: Hsuan Chen Liu, Kaohsiung (TW); Yun Bok Lee, Tainan County (TW); Chia Hua Yu, Banciao (TW); Kun Tsai Huang, Fengshan (TW); Kun Cheng Lee, Tainan County (TW)

(73) Assignee: Hannstar Display Corp. (TW)

( * ) Notice: Subject to any disclaimer, the term of this patent is extended or adjusted under 35 U.S.C. 154(b) by 630 days.

(21) Appl. No.: 12/696,690

(22) Filed: Jan. 29, 2010

(65) Prior Publication Data

US 2010/0259714 A1  Oct. 14, 2010

(30) Foreign Application Priority Data

Apr. 14, 2009  (TW) .............................. 98112278 A

(51) Int. Cl.
*G02F 1/1343* (2006.01)

(52) U.S. Cl.
USPC .......................... 349/141; 349/187; 349/139

(58) Field of Classification Search
None
See application file for complete search history.

(56) References Cited

U.S. PATENT DOCUMENTS

| 6,977,706 B2 * | 12/2005 | Wu et al. ...................... 349/141 |
| 2003/0184699 A1 * | 10/2003 | Matsumoto et al. .......... 349/141 |
| 2005/0213013 A1 * | 9/2005 | Chen et al. .................... 349/141 |

FOREIGN PATENT DOCUMENTS

| CN | 1601359 A | 3/2005 |
| CN | 1797157 A | 7/2006 |
| CN | 101211084 A | 7/2008 |

* cited by examiner

*Primary Examiner* — Lucy Chien
(74) *Attorney, Agent, or Firm* — Lowe Hauptman Ham & Berner, LLP

(57) ABSTRACT

An array substrate for FFS type LCD panel includes a transparent substrate, gate lines, a gate insulating layer, data lines, pixel electrodes, a passivation layer and a common electrode. The gate lines are disposed on the transparent substrate. The gate insulating layer is disposed on the transparent substrate and covers the gate lines. The data lines are disposed on the gate insulating layer. The pixel electrodes are disposed on the gate insulating layer, wherein the pixel electrodes and the data lines are located on the same level. The passivation layer is disposed on the gate insulating layer and covers the pixel electrodes and the data lines. The common electrode is disposed on the passivation layer.

18 Claims, 8 Drawing Sheets

ARRAY SUBSTRATE FOR FFS TYPE LCD PANEL AND METHOD FOR MANUFACTURING THE SAME

CROSS REFERENCE TO RELATED APPLICATION

This application claims the priority benefit of Taiwan Patent Application Serial Number 098112278, filed on Apr. 14, 2009, the full disclosure of which is incorporated herein by reference.

TECHNICAL FIELD

The invention is related to an array substrate, and more particularly to an array substrate for fringe field switching (FFS) type liquid crystal display (LCD) device, wherein a pixel electrode can directly contact a drain electrode, and thus the aperture ratio of a pixel is increased, because it is not necessary that the pixel electrode is electrically connected to the drain electrode by a through hole.

BACKGROUND

Due to the advance of electronic technology, especially for the popularity of portable electronic products, the requirements of light, compact and low-energy consuming display devices are gradually increasing. With the advantages of low-energy consuming, low-heat dissipation, light weight and non-luminescence, liquid crystal display (LCD) device have been widely used in the electronic products and even have replaced the traditional CRT display device.

Referring to FIG. 1, it depicts a conventional LCD device. Typically, the LCD device 10 includes a liquid crystal display (LCD) panel 12 and a backlight module 14. The backlight module 14 is disposed under the LCD panel 12 for distributing the lights from a light source uniformly over the surface of the LCD panel 12. The LCD device 10 further includes a frame 16 for mounting the LCD panel 12 and the backlight module 14.

The refractive indexes of major axis and minor axis of a liquid crystal (LC) molecule in the LCD panel 12 are different, and thus an image depends on the viewing angle of a viewer when the viewer watches the screen of the LCD panel 12. When the viewing angle is gradually big, the contrast is decreased, the color is changed, and even the gray scale is reversed. According to those disadvantages, various types of wide viewing angle technique are developed so as to solve the above-mentioned problem.

Recently, a multi-domain vertical alignment (MVA) technique and a transverse electric field technique are mainly two types of wide viewing angle technique. A fringe field switching (FFS) technique belongs to the transverse electric field technique. The FFS technique has high transmission, wide viewing angle, low color contrast, etc., and thus the FFS technique is one of potential techniques.

Referring to FIGS. 2 and 3, they depict an array substrate 30 of a conventional FFS type LCD panel. A first metallic layer is formed on a glass substrate 32, and is patterned to a plurality of gate lines 34. A plurality of common electrodes 36 are disposed on the glass substrate 32, and the common electrodes 36 and the gate lines 34 are located on the same level. A gate insulating layer 38 is disposed on the glass substrate 32, and covers the gate lines 34 and the common electrodes 36. A second metallic layer is formed on the gate insulating layer 38, and is patterned to a plurality of data lines 40, source electrodes 42 and drain electrodes 44. A passivation layer 46 is disposed on the gate insulating layer 38 and covers the data lines 40, the source electrodes 42 and the drain electrodes 44. A plurality of pixel electrodes 48 are disposed on the passivation layer 46, wherein the pixel electrodes 48 is electrically connected to the drain electrodes 44 by a through hole 50.

Referring to FIG. 4, recently the conventional FFS type LCD panel 12 is characterized in that a layer of transparent electrode 36 (i.e. the common electrode 36 shown in FIG. 3) is added on the bottom of a lower substrate 20 (i.e. the array substrate 30 shown in FIG. 3). The pixel electrodes 48 and the common electrodes 36 can be acted as upper and lower electrodes respectively so as to form a transverse electric field. The transverse electric field can control the rotation of LC molecules 26 in an LC layer 24 between the upper and lower substrates 22, 20.

However, the pixel electrodes must be electrically connected to the drain electrodes by the through hole. The through hole can decrease the aperture ratio of a pixel. Furthermore, when the common electrodes are designed, the distance between the common electrode and the gate electrode must be not small so as not to increase the aperture ratio of a pixel. In addition, the disclination phenomenon of the LC molecules is that the LC molecules are non-continuously arranged in the rubbing direction. The area caused by disclination lines must be considered, and thus useful aperture ratio of a pixel is lower actually. According to the LCD panel with middle size and small size, low aperture ratio of the LCD panel can increase the cost of the backlight module in order to meet the requirement of standard brightness. Thus, lately the low aperture ratio is a disadvantage when LCD panel maker competes with other maker in the market of the LCD panel with middle size and small size.

Accordingly, there exists a need for an array substrate for FFS type LCD panel capable of solving the above-mentioned problems.

SUMMARY

The present invention provides an array substrate for fringe field switching (FFS) type liquid crystal display (LCD) panel, the array substrate including a transparent substrate, gate lines, a gate insulating layer, data lines, pixel electrodes, a passivation layer and a common electrode. The gate lines are disposed on the transparent substrate. The gate insulating layer is disposed on the transparent substrate and covers the gate lines. The data lines are disposed on the gate insulating layer. The pixel electrodes are disposed on the gate insulating layer, wherein the pixel electrodes and the data lines are located on the same level. The passivation layer is disposed on the gate insulating layer and covers the pixel electrodes and the data lines. The common electrode is disposed on the passivation layer.

Compared with the prior art, the pixel electrode of the present invention can directly contact the drain electrode. Thus, the aperture ratio of a pixel is increased, because it is not necessary that the pixel electrode is electrically connected to the drain electrode by a through hole. Furthermore, when the common electrode of the present invention is designed, it is not necessary to consider the distance between the common electrode and the gate line. The aperture ratio of a pixel will not be decreased accordingly.

The foregoing, as well as additional objects, features and advantages of the invention will be more apparent from the following detailed description, which proceeds with reference to the accompanying drawings.

BRIEF DESCRIPTION OF THE DRAWINGS

Embodiments of the present invention are illustrated by way of example, and not by limitation, in the figures of the accompanying drawings, wherein elements having the same reference numeral designations represent like elements throughout and wherein.

DETAILED DESCRIPTION OF THE PREFERRED EMBODIMENT

Figure 1:
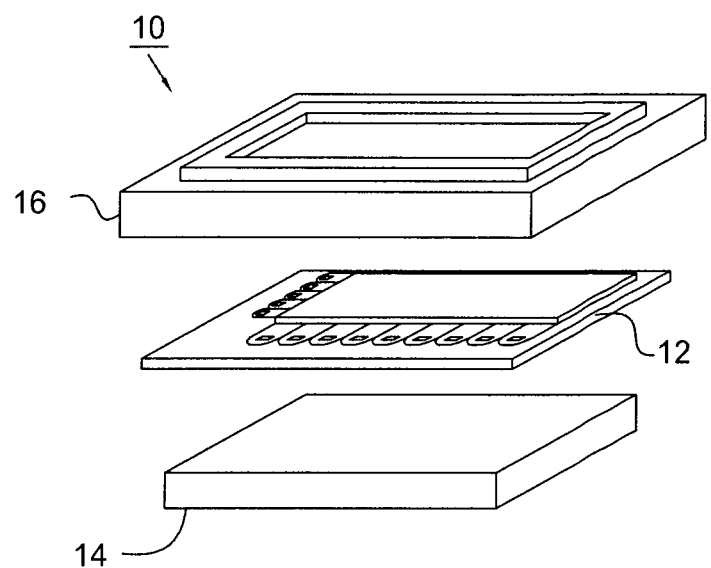
FIG. 1 is an exploded perspective schematic view of a liquid crystal display device in the prior art.
Figure 2:
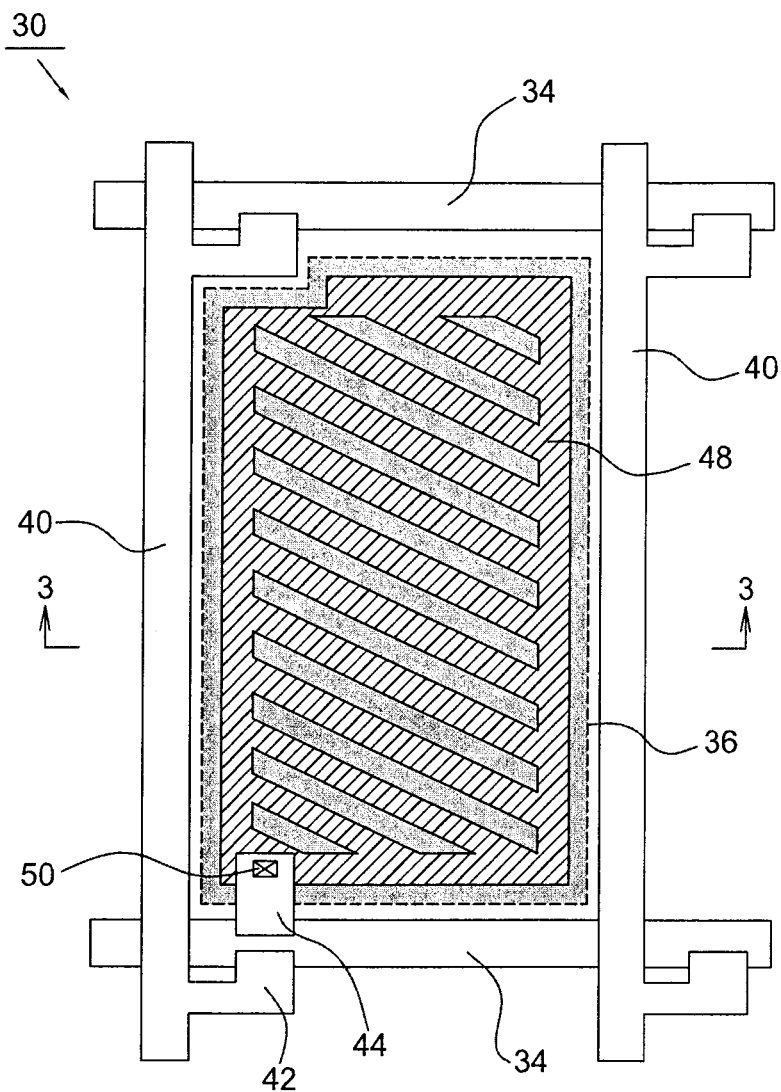
FIG. 2 is a plan schematic view of an array substrate of a conventional FFS type LCD panel in the prior art.
Figure 3:
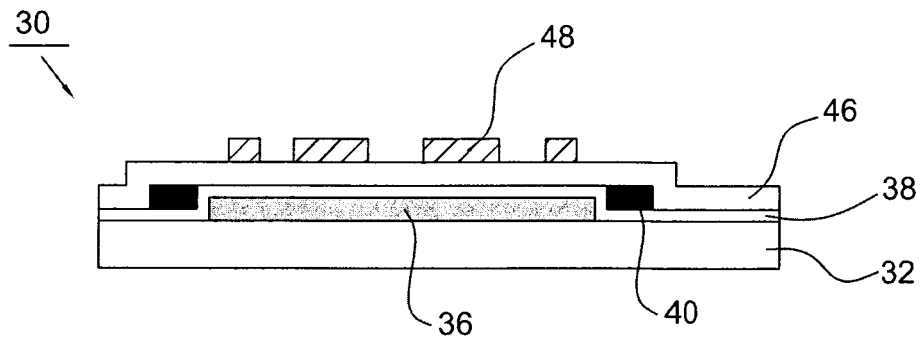
FIG. 3 is a cross-sectional schematic view of the array substrate along line 3-3 of FIG. 2.
Figure 4:
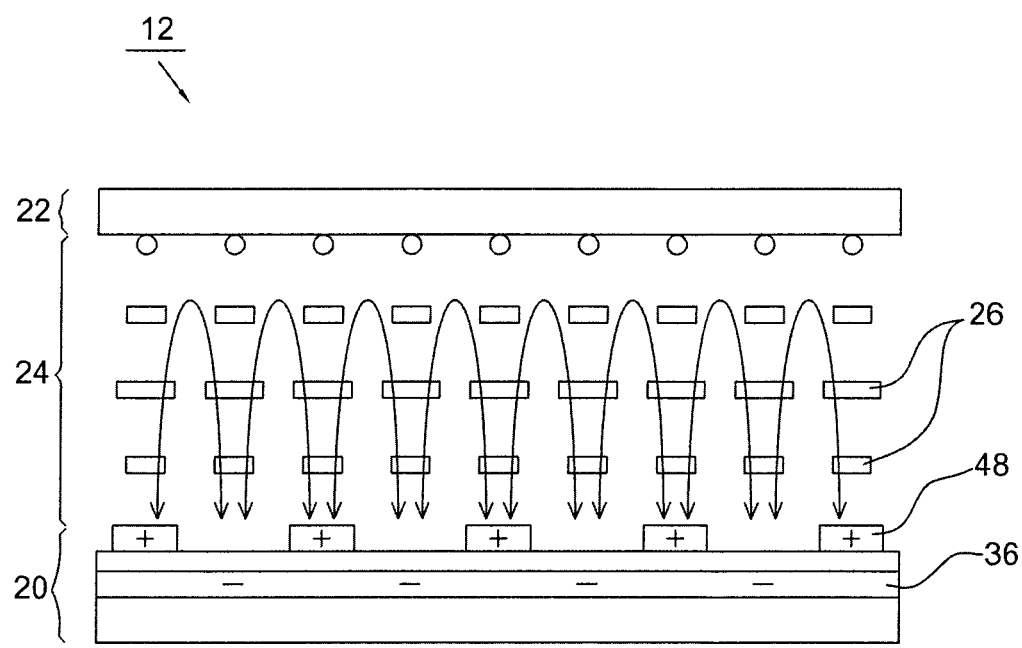
FIG. 4 is a cross-sectional schematic view of a conventional FFS type LCD panel in the prior art.
Figure 5:
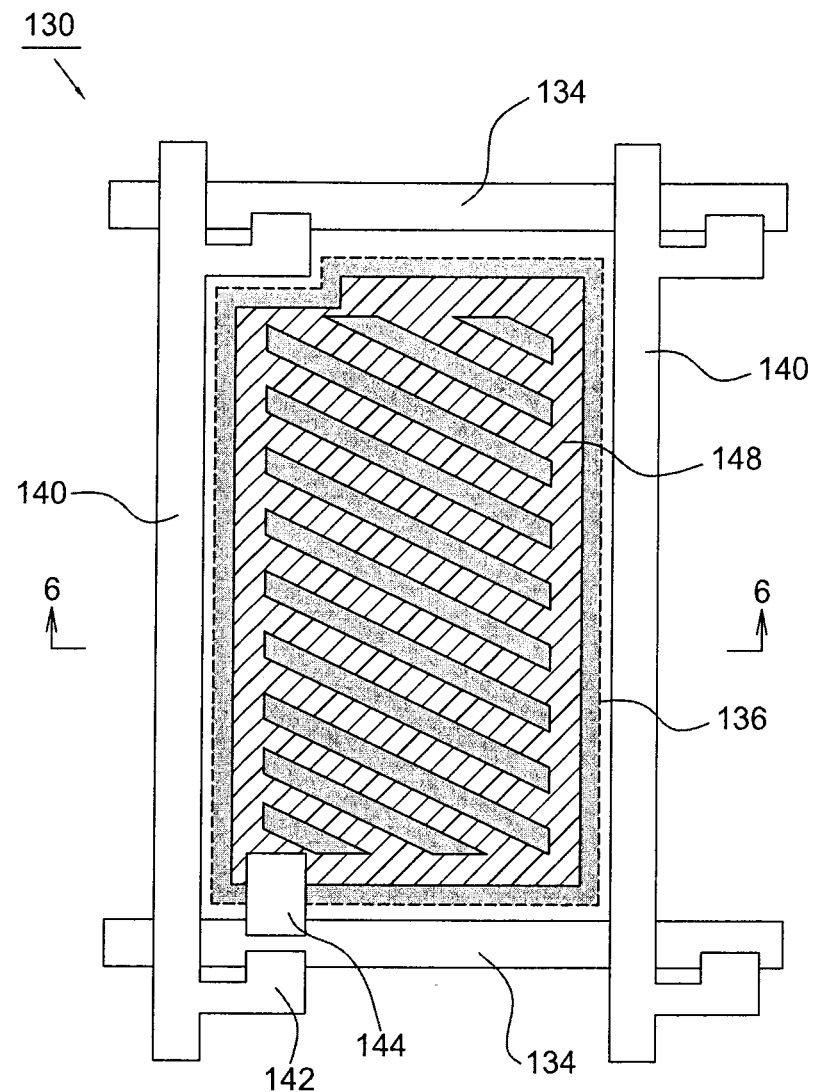
FIG. 5 is a plan schematic view of an array substrate according to the first embodiment of the present invention.
Figure 6:
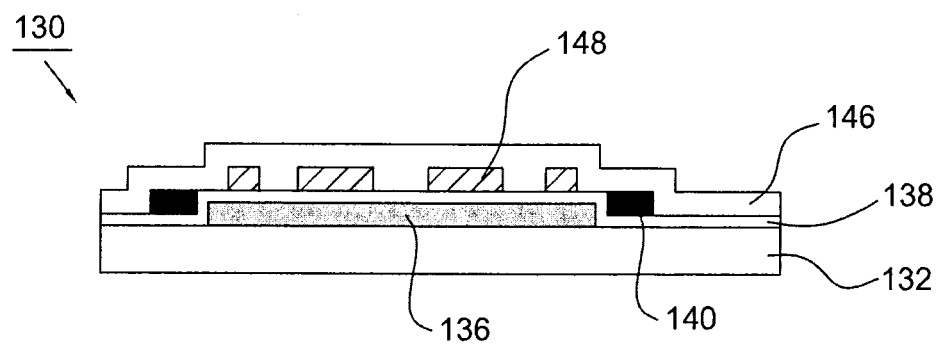
FIG. 6 is a cross-sectional schematic view of the array substrate along line 6-6 of FIG. 5.

Referring to FIGS. 5 and 6, they depict an array substrate 130 for fringe field switching (FFS) type liquid crystal display (LCD) panel according to the first embodiment of the present invention. A plurality of gate lines 134 are disposed on a transparent substrate 132 (e.g. glass substrate). A plurality of common electrodes 136 are disposed on the transparent substrate 132, wherein the common electrodes 136 and the gate lines 134 are located on the same level. A gate insulating layer 138 is disposed on the transparent substrate 132 and covers the gate lines 134 and the common electrodes 136. A plurality of data lines 140, source electrodes 142 and drain electrodes 144 are disposed on the gate insulating layer 138. A plurality of pixel electrodes 148 are also disposed on the gate insulating layer 138, wherein the pixel electrodes 148 and the data lines 140 are located on the gate insulating layer 138, whereby the pixel electrode 148 can directly contact the drain electrode 144. The pixel electrodes 148 and the common electrodes 136 can be acted as upper and lower electrodes respectively so as to form a transverse electric field. The transverse electric field can control the rotation of LC molecules in an LC layer between the upper and lower substrates. The pixel electrodes 148 and the common electrode 136 are made of transparent metallic compound. The transparent metallic compound can be indium tin oxide (ITO) or indium zinc oxide (IZO). A passivation layer 146 is disposed on the gate insulating layer 138 and covers the data lines 140, the source electrodes 142, the drain electrodes 144 and the pixel electrodes 148.

Figure 7:
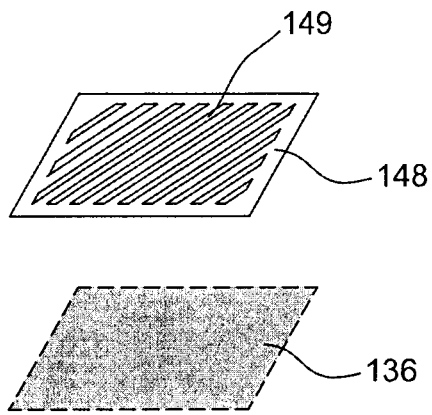
FIG. 7 is an exploded perspective schematic view of the pixel electrode and the common electrode in the first embodiment of the present invention, showing that the pixel electrode and the common electrode are acted as upper and lower electrodes respectively.
Figure 8:
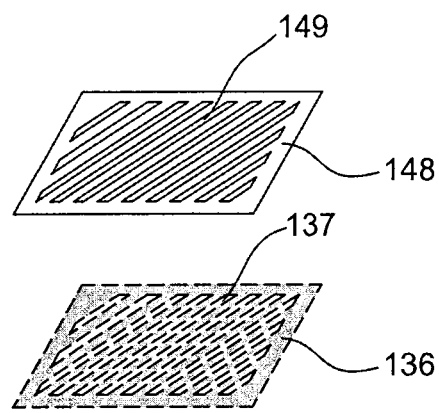
FIG. 8 is an exploded perspective schematic view of the pixel electrode and the common electrode in a further embodiment of the present invention, showing that the pixel electrode and the common electrode are acted as upper and lower electrodes respectively.

Referring to FIG. 7, it depicts the opposite locations of the pixel electrode 148 and the common electrode 136 in this embodiment, when the pixel electrode 148 and the common electrode 136 are acted as upper and lower electrodes respectively. The pixel electrode 148 includes a plurality of slits (bar-shaped hollow portion) 149, and the widths of the slits 149 are less than 5 μm. The common electrode 136 is a piece of transparent electrode layer (i.e. the common electrode 136 has not any slit). Referring to FIG. 8, in a further embodiment, the pixel electrode 148 includes a plurality of first slits 149, and the common electrode 136 includes a plurality of second slits 137, which are parallel to the first slits 149 respectively. The widths of the first and second slits 149, 137 are less than 5 μm.

Compared with the prior art, the pixel electrode of the present invention can directly contact the source electrode. Thus, the aperture ratio of a pixel is increased, because it is not necessary that the pixel electrode is electrically connected to the drain electrode by a through hole.

In addition, a method for manufacturing an array substrate 130 according to the first embodiment of the present invention includes the following steps. A transparent substrate 132 is provided. A first metallic layer is formed on the transparent substrate 132, and then the first metallic layer is patterned to a plurality of gate lines 134. A first transparent electrode layer is formed on the transparent substrate 132, and then the first transparent electrode layer is patterned to a plurality of common electrodes 136, wherein the common electrodes 136 and the gate lines 134 are located on the same level. A gate insulating layer 138 is formed on the transparent substrate 132 and covers the gate lines 134 and the common electrodes 136. A second metallic layer is formed on the gate insulating layer 138, and then the second metallic layer is patterned to a plurality of data lines 140, source electrodes 142 and drain electrodes 144. A second transparent electrode layer is formed on the gate insulating layer 138, and then the second transparent electrode layer is patterned to a plurality of pixel electrodes 148, wherein the pixel electrodes 148 and the data lines 140 are located on the gate insulating layer 138, whereby the pixel electrodes 148 can directly contact the drain electrodes 144. A passivation layer 146 is formed on the gate insulating layer 138, and covers the data lines 140, the source electrodes 142, the drain electrodes 144 and the pixel electrodes 148, shown in FIGS. 5 and 6.

Figure 9:
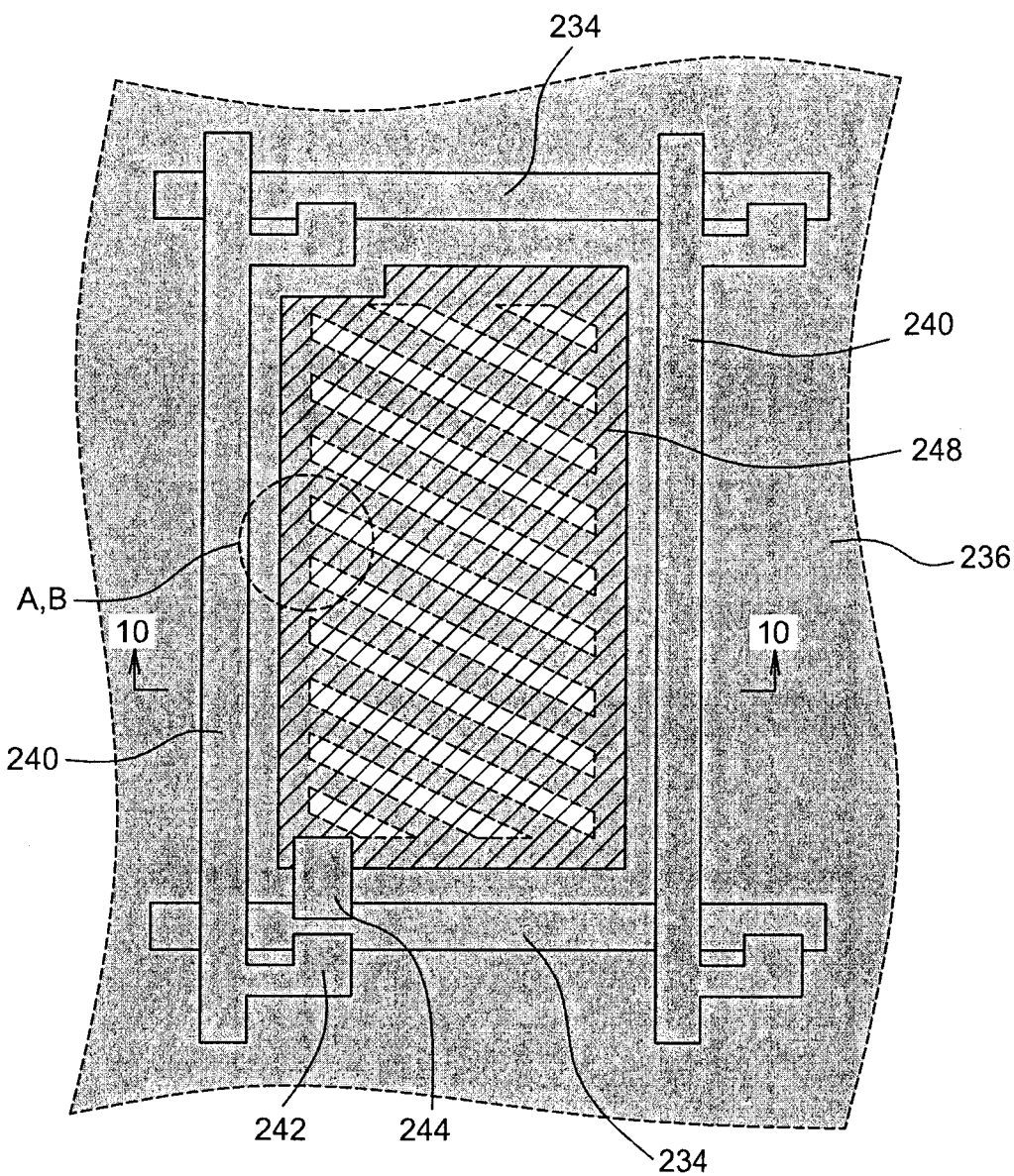
FIG. 9 is a plan schematic view of an array substrate according to the second embodiment of the present invention.
Figure 10:
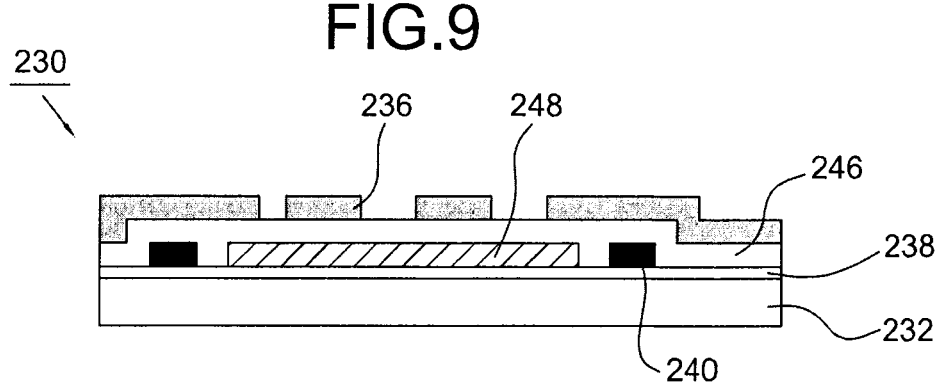
FIG. 10 is a cross-sectional schematic view of the array substrate along line 10-10 of FIG. 9.

Referring to FIGS. 9 and 10, they depict an array substrate 230 according to the second embodiment of the present invention. A plurality of gate lines 234 are disposed on a transparent substrate 232 (e.g. glass substrate). A gate insulating layer 238 is disposed on the transparent substrate 232 and covers the gate lines 234. A plurality of data lines 240, source electrodes 242 and drain electrodes 244 are disposed on the gate insulating layer 238. A plurality of pixel electrodes 248 are also disposed on the gate insulating layer 238, wherein the pixel electrodes 248 and the data lines 240 are located on the same level, whereby the pixel electrode 248 can directly contact the drain electrode 244. A passivation layer 246 is disposed on the gate insulating layer 238 and covers the data lines 240, the source electrodes 242, the drain electrodes 244 and the pixel electrodes 248. A common electrode 236 is disposed on the passivation layer 246. The common electrodes 236 and the pixel electrodes 248 can be acted as upper and lower electrodes respectively so as to form a transverse electric field. The transverse electric field can control the rotation of LC molecules in an LC layer between the upper and lower substrates. The pixel electrodes 248 and the common electrode 236 are made of transparent metallic compound. The transparent metallic compound can be indium tin oxide (ITO) or indium zinc oxide (IZO).

Compared with the prior art, the pixel electrode of the present invention can directly contact the drain electrode. Thus, the aperture ratio of a pixel is increased, because it is not necessary that the pixel electrode is electrically connected to the drain electrode by a through hole. Furthermore, when the common electrode of the present invention is designed, it is not necessary to consider the distance between the common electrode and the gate line. The aperture ratio of a pixel will not be decreased accordingly.

Figure 11:
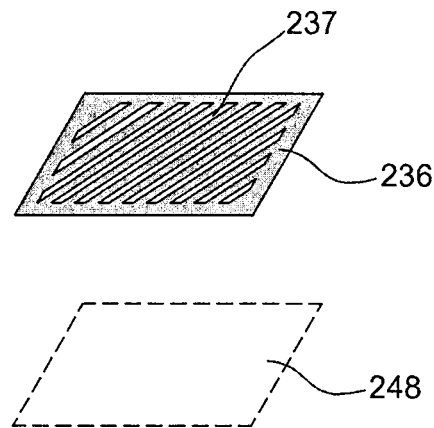
FIG. 11 is an exploded perspective schematic view of the common electrode and the pixel electrode in the second embodiment of the present invention, showing that the common electrode and the pixel electrode are acted as upper and lower electrodes respectively.
Figure 12:
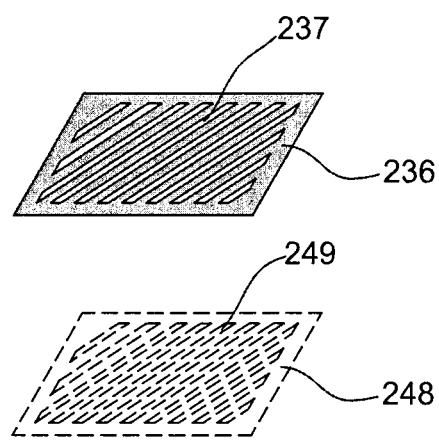
FIG. 12 is an exploded perspective schematic view of the common electrode and the pixel electrode in a further embodiment of the present invention, showing that the common electrode and the pixel electrode are acted as upper and lower electrodes respectively.

Referring to FIG. 11, it depicts the opposite locations of the common electrode 236 and the pixel electrode 248 in this embodiment, when the common electrode 236 and the pixel electrode 248 are acted as upper and lower electrodes respectively. The common electrode 236 includes a plurality of slits (bar-shaped hollow portion) 237, and the widths of the slits 237 are less than 5 μm. The pixel electrode 248 is a piece of transparent electrode layer (i.e. the pixel electrode 248 has not any slit). Referring to FIG. 12, in a further embodiment, the common electrode 236 includes a plurality of first slits 237, and the pixel electrode 248 includes a plurality of second slits 249, which are parallel to the first slits 237 respectively. The widths of the first and second slits 237, 249 are less than 5 μm.

Figure 13:
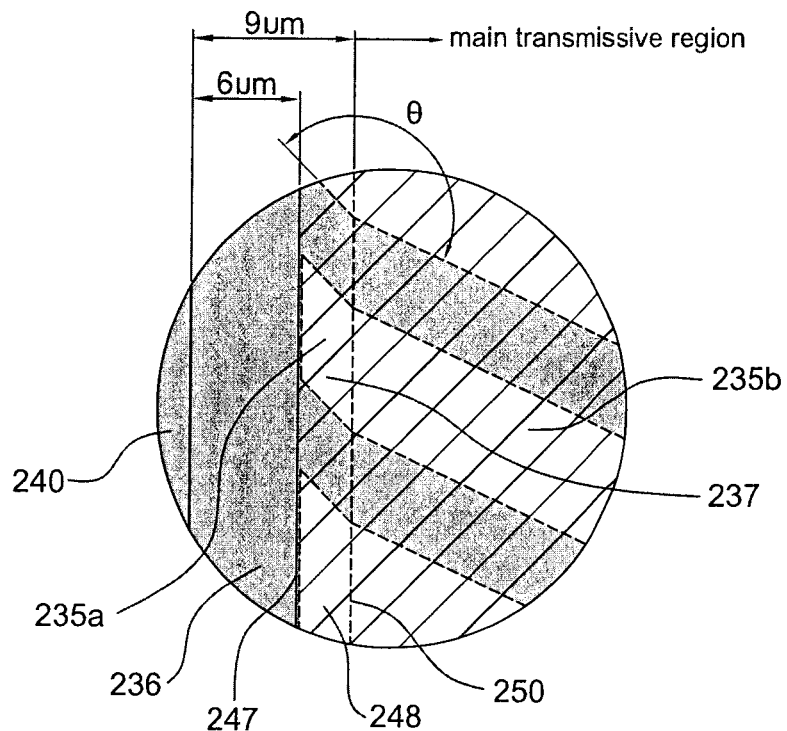
FIG. 13 is a partially expanded plan view of a portion "A" of the array substrate shown in FIG. 9 in this embodiment.

Referring to FIG. 13, it is a partially expanded plan view of a portion "A" of the array substrate 230 in this embodiment shown in FIG. 9. The pixel electrode 248 is a piece of transparent electrode layer (i.e. the pixel electrode 248 has not any slit), but the common electrode 236 includes a plurality of slits 237. Each slit 237 has a rear end 235a and an intermediate portion 235b. The rear end 235a is located outside a boundary line 250 of a main transmissive region, and the rear end 235a is aligned with an edge 247 of the pixel electrode 248. The intermediate portion 235b is located inside the boundary line 250 of the main transmissive region. For example, a gap between the edge 247 of the pixel electrode 248 and the data line 240 is 6 μm, and a gap between the rear end 235a of the slit 237 of the common electrode 236 and the data line 240 is 6 μm, too. A gap between the boundary line 250 of the main transmissive region and the data line 240 is 9 μm. When the rear end 235a of the slit 237 is aligned with the edge 247 of the pixel electrode 248 and the angle between the rear end 235a and the intermediate portion 235b of the slit 237 is less 170 degrees, disclination lines can be increased, i.e. the area caused by the disclination lines can be decreased. Thus, useful aperture ratio of a pixel is higher actually.

Figure 14:
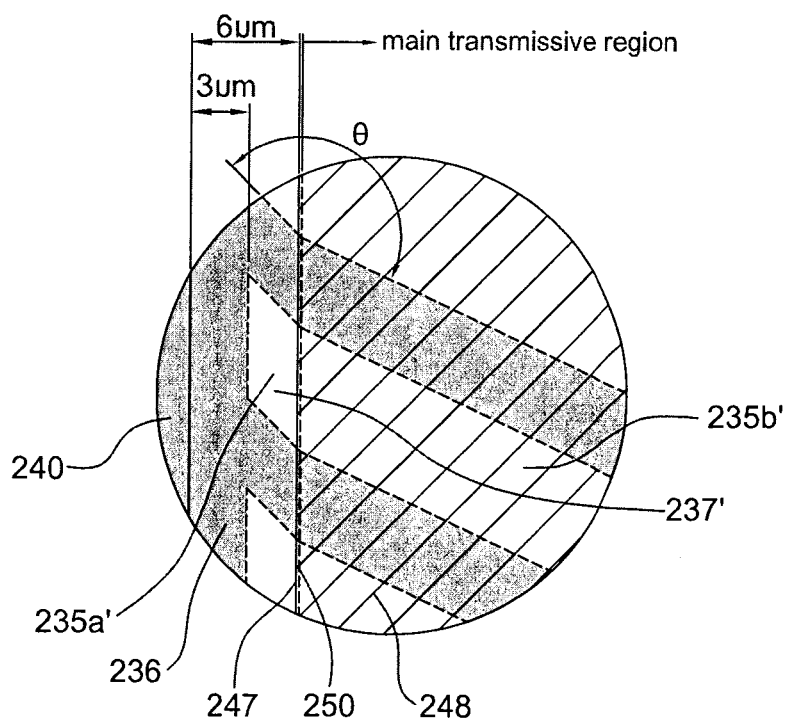
FIG. 14 is a partially expanded plan view of a portion "B" of the array substrate shown in FIG. 9 in another embodiment.

Referring to FIG. 14, it is a partially expanded plan view of a portion "B" of the array substrate 230 in another embodiment shown in FIG. 9. The pixel electrode 248 is a piece of transparent electrode layer (i.e. the pixel electrode 248 has not any slit), but the common electrode 236 includes a plurality of slits 237'. Each slit 237' has a rear end 235a' and an intermediate portion 235b'. The rear end 235a' is located outside a boundary line 250 of a main transmissive region, and the rear end 235a' projects from an edge 247 of the pixel electrode 248. The intermediate portion 235b' is located inside the boundary line 250 of the main transmissive region. For example, a gap between the edge 247 of the pixel electrode 248 and the data line 240 is 6 μm, and a gap between the rear end 235a' of the slit 237' of the common electrode 236 and the data line 240 is 3 μm. A gap between the boundary line 250 of the main transmissive region and the data line 240 is 4 μm. When the rear end 235a' of the slit 237' projects from the edge 247 of the pixel electrode 248 and the angle between the rear end 235a' and the intermediate portion 235b' of the slit 237' is less 170 degrees, disclination lines can be increased, i.e., the area caused by the disclination lines can be decreased. Thus, useful aperture ratio of a pixel is higher actually.

It is noted that FIGS. 13 and 14 is not limited to the second embodiment of the present invention, the technical disclosures described in FIGS. 13 and 14 are also applied to the first embodiment of the present invention so as to also have the same function.

In addition, a method for manufacturing an array substrate 230 according to the second embodiment of the present invention includes the following steps. A transparent substrate 232 is provided. A first metallic layer is formed on the transparent substrate 232, and then the first metallic layer is patterned to a plurality of gate lines 234. A gate insulating layer 238 is formed on the transparent substrate 232 and covers the gate lines 234. A second metallic layer is formed on the gate insulating layer 238, and then the second metallic layer is patterned to a plurality of data lines 240, source electrodes 242 and drain electrodes 244. A first transparent electrode layer is formed on the gate insulating layer 238, and then the first transparent electrode layer is patterned to a plurality of pixel electrodes 248, wherein the pixel electrodes 248 and the data lines 240 are located on the same level, whereby the pixel electrode 248 can directly contact the drain electrode 244. A passivation layer 246 is disposed on the gate insulating layer 238 and covers the data lines 240, the source electrodes 242, the drain electrodes 244 and the pixel electrodes 248. A second transparent electrode layer (i.e. common electrode 236) is formed on the passivation layer 246, shown in FIGS. 9 and 10.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An array substrate for fringe field switching (FFS) type liquid crystal display (LCD) panel, the array substrate comprising:
   a transparent substrate;
   a plurality of gate lines disposed on the transparent substrate;
   a gate insulating layer disposed on the transparent substrate and covering the gate lines;
   a plurality of data lines disposed on the gate insulating layer;
   a plurality of transparent pixel electrodes disposed on the gate insulating layer, wherein the pixel electrodes and the data lines are located on the same level, and each of the pixel electrodes is free of slits;
   a passivation layer disposed on the gate insulating layer and covering the pixel electrodes and the data lines; and
   a transparent common electrode disposed on the passivation layer.

2. The array substrate as claimed in claim 1, wherein the transparent pixel electrodes and the transparent common electrode are made of transparent metallic compound.

3. The array substrate as claimed in claim 2, wherein the transparent metallic compound is one of indium tin oxide (ITO) and indium zinc oxide (IZO).

4. The array substrate as claimed in claim 1, further comprising:
a plurality of drain electrodes each having direct contact with one of the transparent pixel electrodes.

5. The array substrate as claimed in claim 1, wherein
the transparent common electrode includes a plurality of slits, and
a width of each of the slits is less than 5 μm.

6. The array substrate as claimed in claim 5, wherein
each of the slits has a rear end and an intermediate portion,
the rear end is located outside a main transmissive region,
the intermediate portion is located inside the main transmissive region, and
an angle between the rear end and the intermediate portion is obtuse and less than 170 degrees.

7. The array substrate as claimed in claim 6, wherein the rear end is aligned with an edge of the transparent pixel electrode.

8. The array substrate as claimed in claim 6, wherein the rear end projects from an edge of the transparent pixel electrode.

9. A method of manufacturing an array substrate for fringe field switching (FFS) type liquid crystal display (LCD) panel, the method comprising:
forming a first metallic layer on a transparent substrate, and then patterning the first metallic layer into a plurality of gate lines;
forming a gate insulating layer on the transparent substrate to cover the gate lines;
forming a second metallic layer on the gate insulating layer, and then patterning the second metallic layer into a plurality of data lines;
forming a first transparent electrode layer on the gate insulating layer, and then patterning the first transparent electrode layer into a plurality of transparent pixel electrodes, wherein the pixel electrodes and the data lines are located on the same level, and each of the pixel electrodes is free of slits;
forming a passivation layer on the gate insulating layer to cover the pixel electrodes and the data lines; and
forming a second transparent electrode layer on the passivation layer, wherein the second transparent electrode layer defines a transparent common electrode.

10. The method as claimed in claim 9, wherein the second metallic layer is further patterned into a plurality of drain electrodes each having direct contact with one of the transparent pixel electrodes.

11. An array substrate for fringe field switching (FFS) type liquid crystal display (LCD) panel, the array substrate comprising:
a transparent substrate;
a plurality of gate lines disposed on the transparent substrate;
a plurality of transparent common electrodes disposed on the transparent substrate, wherein the common electrodes and the gate lines are located on the same level, and each of the common electrodes is free of slits;
a gate insulating layer disposed on the transparent substrate and covering the gate lines and the common electrodes;
a plurality of data lines disposed on the gate insulating layer;
a plurality of transparent pixel electrodes disposed on the gate insulating layer; and
a passivation layer disposed on the gate insulating layer and covering the pixel electrodes and the data lines.

12. The array substrate as claimed in claim 11, further comprising:
a plurality of drain electrodes each having direct contact with one of the transparent pixel electrodes.

13. The array substrate as claimed in claim 11, wherein
each of the transparent common electrodes includes a plurality of slits, and
a width of each of the slits is less than 5 μm.

14. The array substrate as claimed in claim 13, wherein
the slit has a rear end and an intermediate portion,
the rear end is located outside a main transmissive region,
the intermediate portion is located inside the main transmissive region, and
an angle between the rear end and the intermediate portion is obtuse and less than 170 degrees.

15. The array substrate as claimed in claim 14, wherein the rear end is aligned with an edge of the transparent pixel electrode.

16. The array substrate as claimed in claim 14, wherein the rear end projects from an edge of the transparent pixel electrode.

17. The array substrate as claimed in claim 5, wherein the slits have closed ends and no open ends.

18. The array substrate as claimed in claim 13, wherein the slits have closed ends and no open ends.

* * * * *